(12) United States Patent
Newbold

(10) Patent No.: US 10,710,486 B2
(45) Date of Patent: Jul. 14, 2020

(54) LATCH MECHANISM

(71) Applicant: Safran Seats USA LLC, Gainesville, TX (US)

(72) Inventor: Tyler Newbold, Howe, TX (US)

(73) Assignee: Safran Seats USA LLC, Gainesville, TX (US)

( * ) Notice: Subject to any disclaimer, the term of this patent is extended or adjusted under 35 U.S.C. 154(b) by 24 days.

(21) Appl. No.: 15/779,917

(22) PCT Filed: Jul. 7, 2016

(86) PCT No.: PCT/US2016/041323
§ 371 (c)(1),
(2) Date: May 30, 2018

(87) PCT Pub. No.: WO2017/095477
PCT Pub. Date: Jun. 8, 2017

(65) Prior Publication Data
US 2018/0319306 A1 Nov. 8, 2018

Related U.S. Application Data

(60) Provisional application No. 62/263,247, filed on Dec. 4, 2015.

(51) Int. Cl.
*B60N 3/00* (2006.01)
*B64D 11/06* (2006.01)

(52) U.S. Cl.
CPC .......... *B60N 3/004* (2013.01); *B64D 11/0638* (2014.12)

(58) Field of Classification Search
CPC ..... B60N 3/004; B60N 3/002; B64D 11/0638

USPC ................................. 297/163, 173
See application file for complete search history.

(56) References Cited

U.S. PATENT DOCUMENTS

| 6,550,861 | B1* | 4/2003 | Williamson | B60N 3/004 |
| | | | | 108/44 |
| 6,814,404 | B2* | 11/2004 | Jensen | A47C 7/38 |
| | | | | 108/13 |
| 8,205,938 | B2* | 6/2012 | Speh | B64D 11/06 |
| | | | | 297/163 |
| 2013/0093220 | A1* | 4/2013 | Pajic | B64D 11/0015 |
| | | | | 297/163 |

(Continued)

FOREIGN PATENT DOCUMENTS

| DE | 3110130 A1 | 10/1982 |
| DE | 102011011657 A1 | 8/2012 |

(Continued)

OTHER PUBLICATIONS

International Patent Application No. PCT/US2016/041323, International Search Report and Written Opinion, dated Nov. 3, 2016.

*Primary Examiner* — Milton Nelson, Jr.
(74) *Attorney, Agent, or Firm* — Kilpatrick Townsend & Stockton LLP

(57) ABSTRACT

Described are latching mechanisms having an eccentric member configured to interact with a support assembly, such that the eccentric member can cause a passenger article to displace relative to the support assembly. Also described are seat assemblies employing latching mechanisms for causing a passenger article to displace into a stowed configuration in the seat assemblies, and methods of stowing a passenger article.

21 Claims, 8 Drawing Sheets

(56) References Cited

U.S. PATENT DOCUMENTS

2014/0077533 A1 3/2014 Shih et al.

FOREIGN PATENT DOCUMENTS

EP 2708413 A1 3/2014
WO 2012110221 A1 8/2012

* cited by examiner

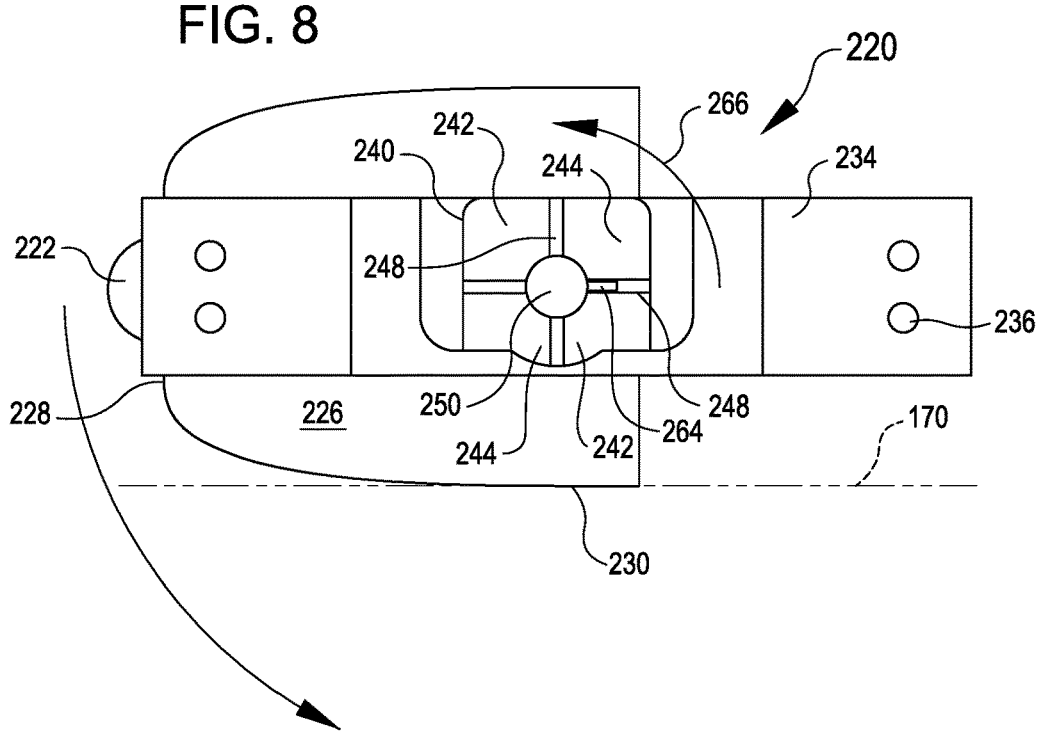
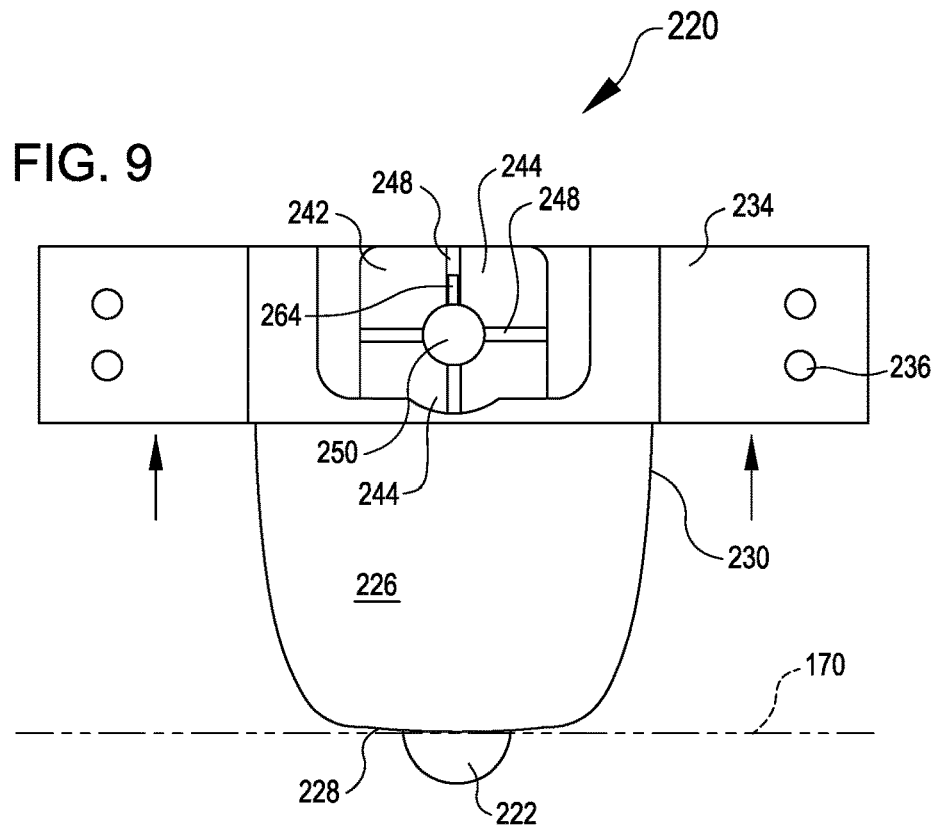

LATCH MECHANISM

CROSS REFERENCE TO RELATED APPLICATIONS

This application is related to and claims priority benefits from U.S. Provisional Application Ser. No. 62/263,247 ("the '247 application"), filed on Dec. 4, 2015, entitled LATCH MECHANISM. The '247 application is hereby incorporated in its entirety by this reference.

FIELD OF THE INVENTION

The field of the invention relates to latching mechanisms for securing accessories such as tray tables in passenger seats or facing passenger seats.

BACKGROUND

Safety is the paramount design criteria for passenger amenities, particularly in the context of aircraft furnishings. For example, amenities should not contribute to traumatic head and neck injury during a high impact event. Related safety standards include the head impact criteria (HIC). During head impact criteria (HIC) testing, it has been found that the tray table facing a passenger seat can contribute to head and neck injuries. If the table creates a lip under the video shroud, the chin of the crash test dummy can catch and cause the head to twist. This is deemed as a failed test. Various strategies have been attempted for solving this issue. For example, a spring loaded table that stowed inside of the video shroud was attempted; however, the table could be deployed by the test dummy during HIC testing when the head would drag on the table and pull it out.

The general goal is to prevent the head trajectory of a passenger, in the case of crash, from contacting any sharp or protruding edges. As a result, there is a need for a mechanism to prevent the protrusion of accessories such as the tray table and any tray table retention features into the head trajectory of passengers, and to prevent inadvertent deployment of said accessories and features. There is also a general need for such mechanisms to add minimal weight and to be intuitive to operate.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, a latch mechanism is provided that can cause a passenger article to displace relative to a support assembly that supports the passenger article. In embodiments, the latch mechanism includes an eccentric member having an axis and a periphery that is rotatably connected with the latch mechanism. The periphery has a major working surface and a minor working surface, the major working surface being farther from the axis than the minor working surface. When the eccentric member is rotated, the eccentric member can engage with the support assembly such that the eccentric member causes the passenger article to displace relative to the support assembly.

According to certain embodiments of the present disclosure, a passenger seat assembly is provided that includes a passenger seat, a support assembly connected with the passenger seat; a passenger article supported by the support assembly; and a latch mechanism arranged to interact with the passenger article and the support assembly. The latch mechanism includes an eccentric member connected either the support assembly or the passenger article. The eccentric member can be rotated relative to the latch mechanism, and has at least one working surface in contact the other of the support assembly and passenger article. When the eccentric member is rotated, the at least one working surface presses against the support assembly or the passenger article, causing the passenger article to displace relative to the support assembly.

In some embodiments, the latch mechanism is attached with the passenger article, and the at least one working surface of the eccentric member presses against a support surface of the support assembly, so that the latch mechanism moves with the passenger article and presses the passenger article away from the support assembly.

In some embodiments, the passenger seat includes a seatback shroud with a pocket disposed therein that is configured to at least partially receive the passenger article. Thus, when the passenger article is disposed in an upright position, and the latch mechanism is actuated by rotating the eccentric member, the passenger article can be received within the pocket of the seatback shroud.

According to certain embodiments of the present disclosure, a method of stowing a passenger article of a passenger seat is provided. The method includes, with the passenger article aligned with a pocket of a seatback shroud of the passenger seat, rotating an eccentric member connected with the passenger article. When the eccentric member is rotated, one or more working surfaces of the eccentric member contact a support surface adjacent with the eccentric member, causing the passenger article and eccentric member to displace relative to the support surface. When the passenger article is displaced away from the support surface it can be at least partially received in the pocket.

In some embodiments, the method can include rotating the eccentric member from an unlocked position to a locked position. For example, when the eccentric member is rotated, a curved working surface of the periphery of the eccentric member can press against the support surface causing an axis of the eccentric member to displace away from the support surface. When the eccentric member comes to rest in the locked position, a major working surface of the eccentric member comes into contact with the support surface, the major working surface being a greater distance from the axis than the minor working surface.

BRIEF DESCRIPTION OF THE DRAWINGS

FIG. 8 is a back view of the latch mechanism of FIGS. 5-7 in an unlocked position.

FIG. 9 is a back view of the latch mechanism of FIGS. 5-8 in a locked position.

DETAILED DESCRIPTION

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments provide latch mechanisms for passenger seats. While the latch mechanisms are discussed for use with aircraft seats, they are by no means so limited. Rather, embodiments of the latch mechanisms may be used in passenger seats or other seats of any type or otherwise as desired.

Figure 1:
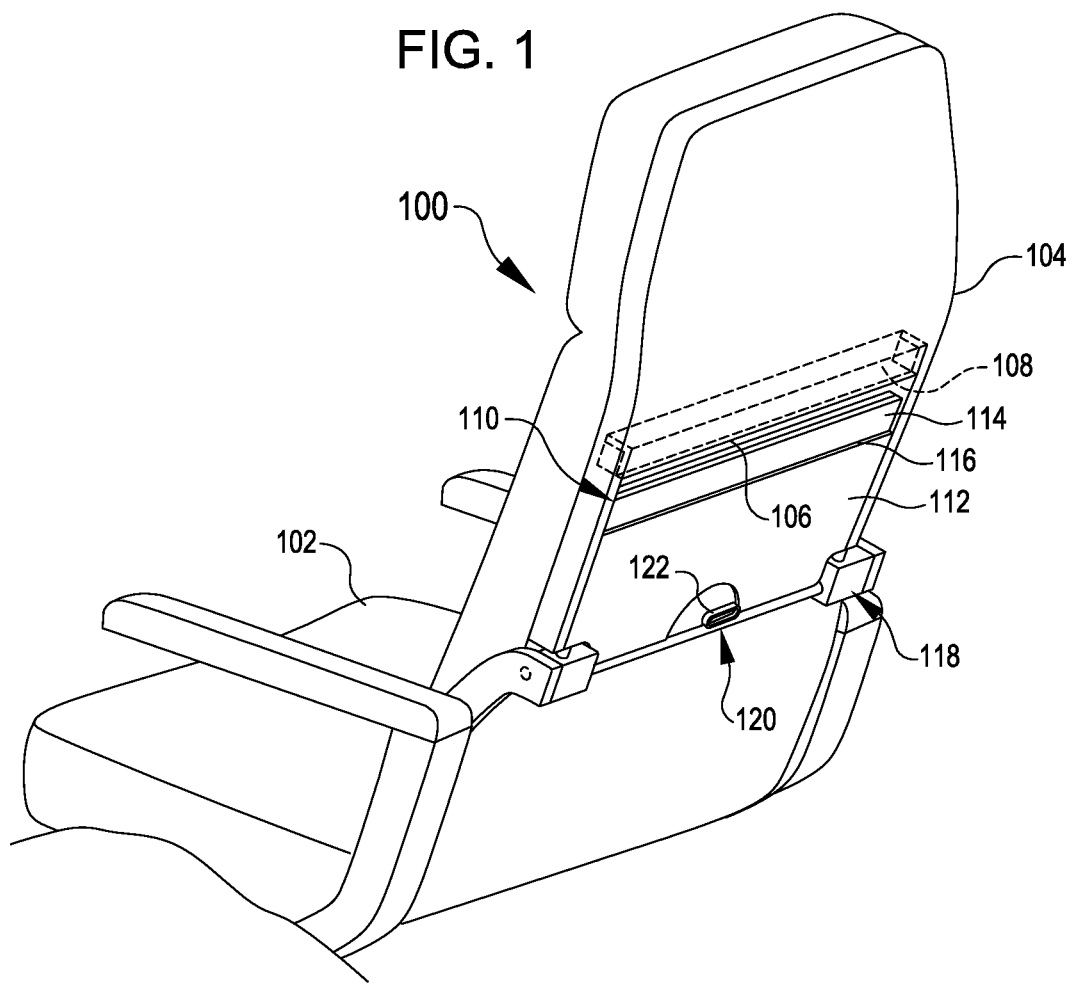
FIG. 1 is a perspective view of a latch mechanism for a passenger article mounted to a passenger seat, according to certain embodiments of the present disclosure.

According to certain embodiments, as shown in FIG. 1, a passenger seat 100 can include a passenger article 110, which may be a tray table, and a latch mechanism 120 for securing the passenger article in a stowed configuration. In various embodiments, a passenger article 110 can include such supportive devices as, e.g., a tray table, a drink holder, a platform for passenger electronics or reading materials, a support for stowing or supporting passenger items, or any comparable article. The passenger seat 100 includes seat assembly 102, a seat shroud 104 and a pocket 108 in the shroud defined by a lip 106 that overhangs the pocket. A support assembly 118 is connected with the seat assembly 102 and is generally able to support the passenger article 110 such that it can rotate outward away from the seat 100. The pocket 108 is sized to accommodate part of a passenger article 110. In some cases, the passenger article 110 can have a shaped design configured to interact with the pocket 108. For example, the passenger article 110 can have a main portion 112 and a narrow portion 114 defined by a step 116. The narrow portion 114 may be sized and positioned such that, when the passenger article 110 is slid upward into the pocket 108, the step 116 and the lip 106 of the pocket are placed proximate to one another. Parts herein described such as the seat shroud 104, passenger article 110, support assembly 118, and other parts, may be formed of materials including but not limited to aluminum, stainless steel, aramid fibers, polycarbonate, polypropylene, other metallic materials, composite materials, or other similar materials.

The passenger article 110 is connected with the passenger seat 100 by a support assembly 118. Generally, the support assembly 118 allows the passenger article 110 to rotate outward from the seat shroud 104 in order to deploy over the lap of a user. The passenger article 110 can be stowed by lifting and rotating the passenger article back up toward the seat shroud 104. Generally, the support assembly 118 also allows the passenger article 110 to slide at least a short distance outward from the support assembly 118. The latch mechanism 120 is connected with the passenger article 110 and interacts with the support assembly 118. Thus, when the passenger article 110 is positioned against the seat shroud 104, the passenger article can be slid upward so that at least a portion, e.g. the narrow portion 114, of the passenger article can fit into the pocket 108 to secure the passenger article in place. In particular, the passenger article 110 can be secured in the pocket 108 when a user actuates the latch mechanism 120, e.g. by rotating a handle 122 of the latch mechanism. The specific means by which the latch mechanism 120 operates to lift the passenger article 110 will be better understood with reference to FIGS. 2-9 below.

The latch mechanism 120 can support the passenger article 110 in a raised or locked position partially inserted in the pocket 108. When the passenger article 110 is stored and locked, the passenger article does not protrude into the head path of a passenger. In particular, a transition from the shroud 104 to the passenger article 110, moving from top to bottom, does not include any horizontal protrusions that could block the motion of a passenger. Further, in either the locked or unlocked configurations, the latch mechanism 120 is generally below a level of the motion of a passenger's head in the event of a sudden deceleration.

Figure 2:
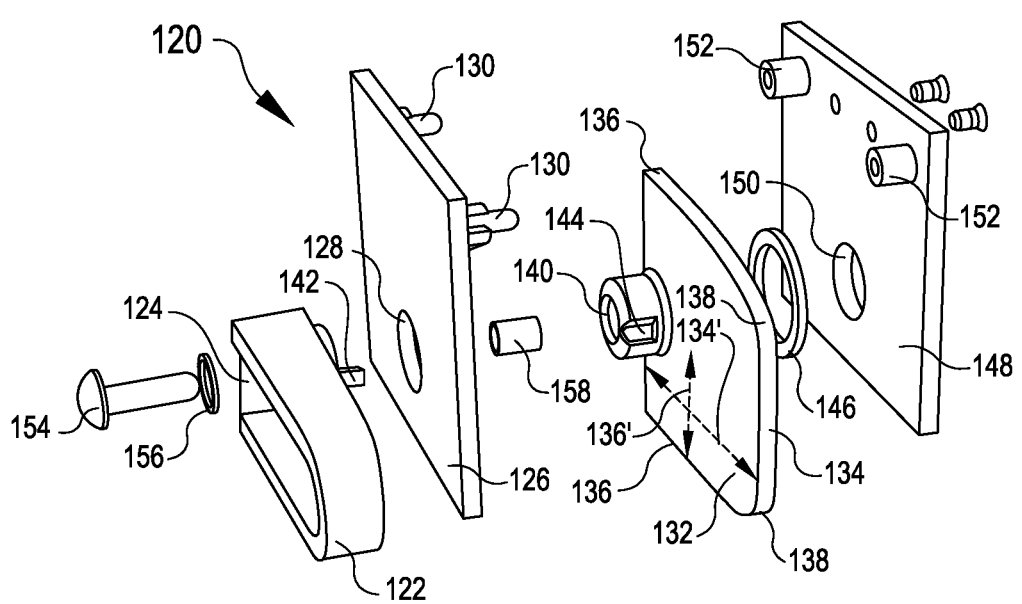
FIG. 2 is an exploded assembly view of a latch mechanism for use with a passenger seat such as the passenger seat shown in FIG. 1.

In some embodiments, as shown in FIG. 2, a latch mechanism 120 can include a handle 122 and an eccentric member 132. The handle 122 and eccentric member 132 are fixed relative to one another but rotatable together in the latch mechanism 120. The eccentric member 132 is operable like a cam, with the periphery of the eccentric member being defined a major working surface 134 a first long distance 134' from the axis and by minor working surfaces 136 a second shorter distance 136' from the axis 140. Curved working surfaces 138 connect the minor and major working surfaces 136, 134. The latch mechanism 120 is illustrated in an unlocked configuration, with the eccentric member 132 pointing sideways. The latch mechanism 120 operates by the handle 122 being rotated by a user, and rotating the eccentric member 132 therewith. When the latch mechanism 120 is actuated, the eccentric member 132 rotates so that the working surfaces 134, 136, 138 alternatingly contact another surface (e.g. support surface 170, see FIGS. 3 and 4). In some embodiments, the first distance 134' is about 0.25 inches greater than the second distance 136', such that the eccentric member 132 causes a displacement of the passenger article of at least 0.25 inches when rotated from the unlocked configuration to the locked configuration. For example, the first distance 136' may be approximately 1.25" and the second distance 134' may be approximately 1.5". The first and second distances 134' and 136' may vary in length depending on the specific geometry of the eccentric member, provided the first distance 134' is longer than the second distance 136'. In some cases, the first distance 134' may be more than 0.25" longer than the second distance 136". For example, in some specific embodiments, the first distance 134' is at least 0.5" longer than the second distance 136". In some cases, the eccentric member 226 may be rotated to an unlocked configuration from a locked configuration by rotating the eccentric member in either direction, i.e. an eccentric member can have two minor working surfaces 136 disposed perpendicular to the major working surface 134 to either side.

In some specific embodiments, the latch mechanism 120 includes the handle 122 and the eccentric member 132 which are connected together by way of a connector 154. The handle 122 and eccentric member 132 can be rotatably fixed together by, e.g., a tooth 142 and slot 144 aligned offset from the handle axis 124 and eccentric member axis 140. The handle 122 and eccentric member 132 can be supported between two or more (first and second) supports 126 and 148 with through-holes 128 and 150 therethrough, such that the handle and eccentric member can rotate together relative to the support plates. The connector 154 can be a pin, bolt, screw, or any comparable connector. The connector 154 can be supported by, e.g., a washer 156 and/or a sleeve 158 for enabling attachment of the handle 122 with the eccentric member 132. The latch mechanism 120 can also employ one or more spacers 146, which may include friction-reducing members and/or friction reducing materials, for positioning the eccentric member 132 between the supports 126, 148. The supports 126, 148 can be attachable together, e.g. by attachment features 130, 152. The supports 126, 148 are also generally attachable with a passenger article such as the passenger article 110 of FIG. 1. For example, attachment features 130, 152 can be configured to also attach the supports 126, 148 with the passenger article 110.

Figure 3:
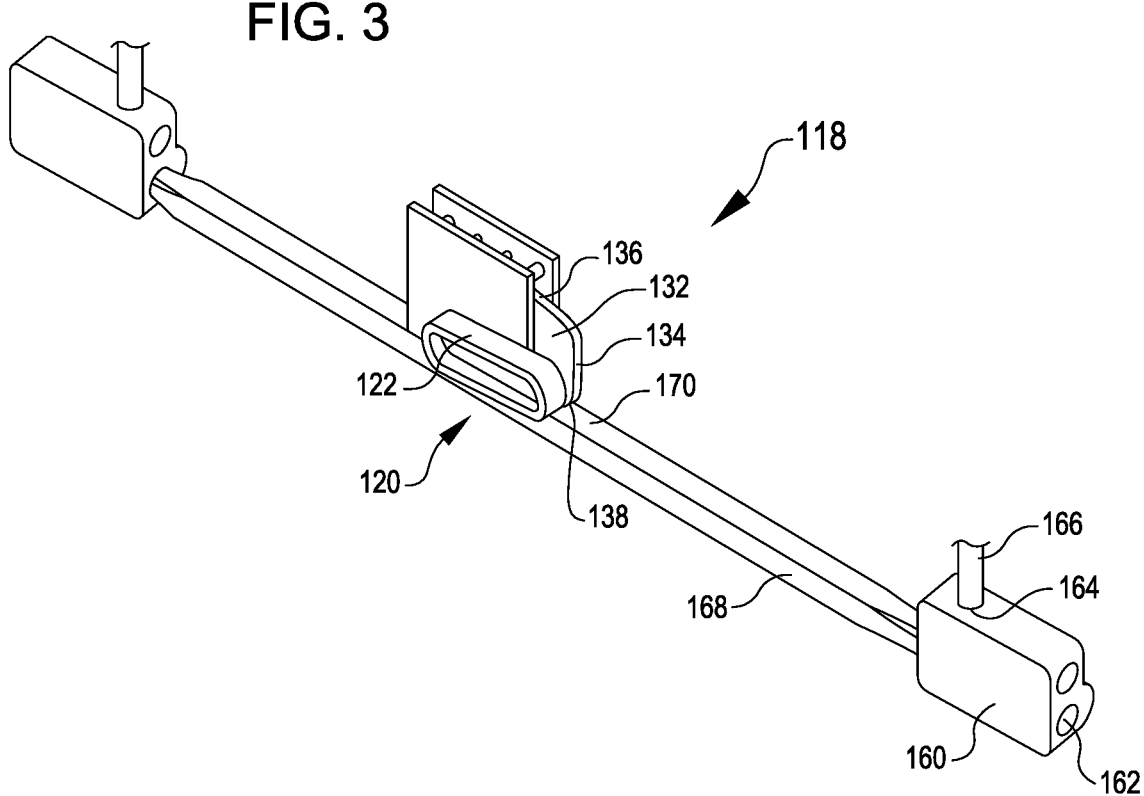
FIG. 3 is a perspective view of the latch mechanism of FIG. 2 assembled with a passenger article support assembly in an unlocked position.
Figure 4:
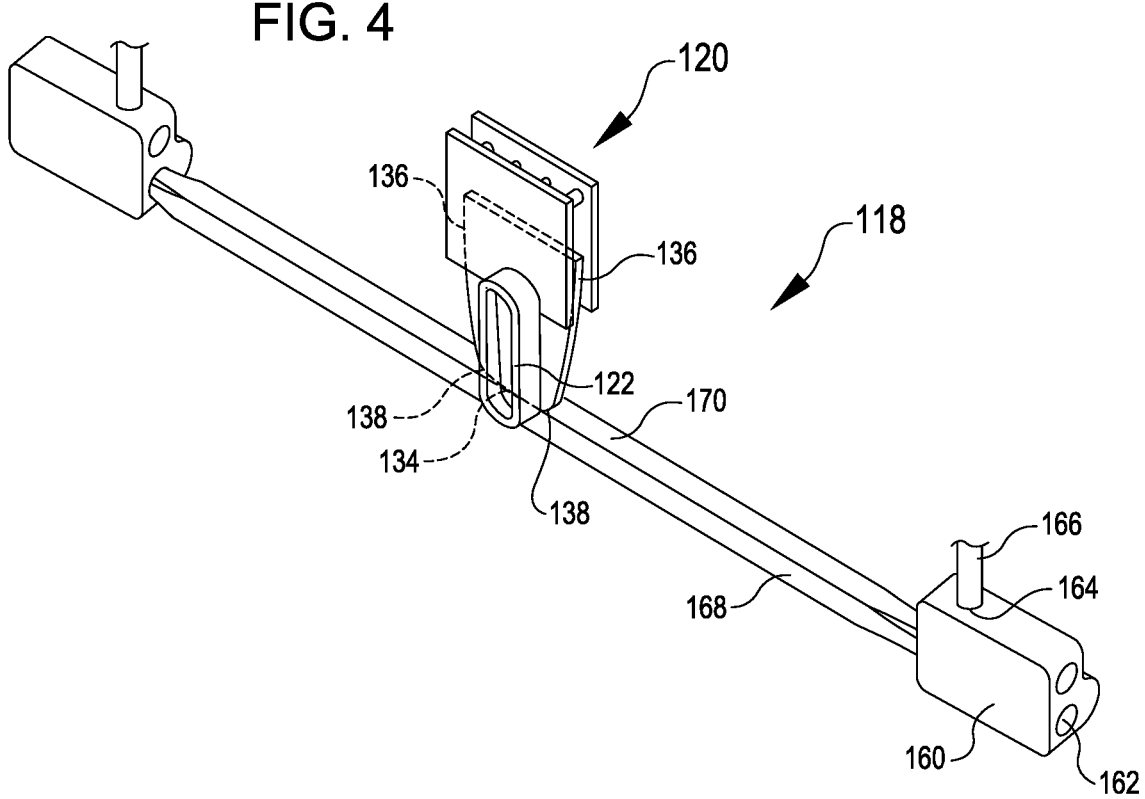
FIG. 4 is a perspective view of the latch mechanism of FIGS. 2 and 3 in a locked position.

FIGS. 3 and 4 illustrate the latch mechanism 120 in conjunction with a support assembly 118 in both an unlocked configuration (FIG. 3) and a locked configuration (FIG. 4), in accordance with certain embodiments. FIG. 3 shows a support assembly 118 having support elements 160 that are connected by a support member 168. The support elements 160 are further connected with rods 166 for connecting the support assembly 118 with, e.g. a passenger article such as passenger article 110. The rods 166 may be fixed to the support elements 160, or may be slidingly attached with the support elements via channels 164. The support elements 160 have attachment features 162 for, e.g., rotatably attaching the support assembly 118 with a passenger seat such as passenger seat 102.

In FIG. 3, the latch mechanism 120 is shown with eccentric member 132 pointing sideways, such that the major working surface 134 is not in contact with a support surface 170 of the support member 168. In this configuration, one of the minor working surfaces 136 will be in contact with the support surface 170. The handle 122 is fixed relative to the eccentric member 132, but the handle and eccentric member are rotatable together relative to the latch assembly 120. The handle 122 can be rotated to cause the eccentric member 132 to rotate, so that the minor working surfaces 136 cease to be in contact with the support surface 170, and so that the curved working surface 138 interacts with the support surface to lift the latch assembly 120 relative to the support assembly 118.

In FIG. 4, the latch mechanism 120 is shown with eccentric member 132 pointing down, such that the major working surface 134 is in contact with the support surface 170. In this configuration, which may be referred to as the locked configuration, the latch mechanism 120 is raised relative to the support assembly 118. The major working surface 134 comes into contact with the support surface 170 when the eccentric member 132 and handle 122 are oriented vertically. The major working surface 134 may be flattened compared with the curved working surfaces 138. When the latch mechanism 120 is in the locked configuration, the major working surface 134 resting on the support surface 170 can cause the latch mechanism to resist rotation of the handle 122 and eccentric member 132. In the exemplary latch mechanism 120 shown in FIGS. 1-4, the latch mechanism is stable when locked or unlocked due to, at least in part, the interaction of the flattened major and minor working surfaces 134, 136 with the support surface 170. However, other means of providing stability are possible, as will be shown with reference to FIGS. 5-9, below.

Figure 5:
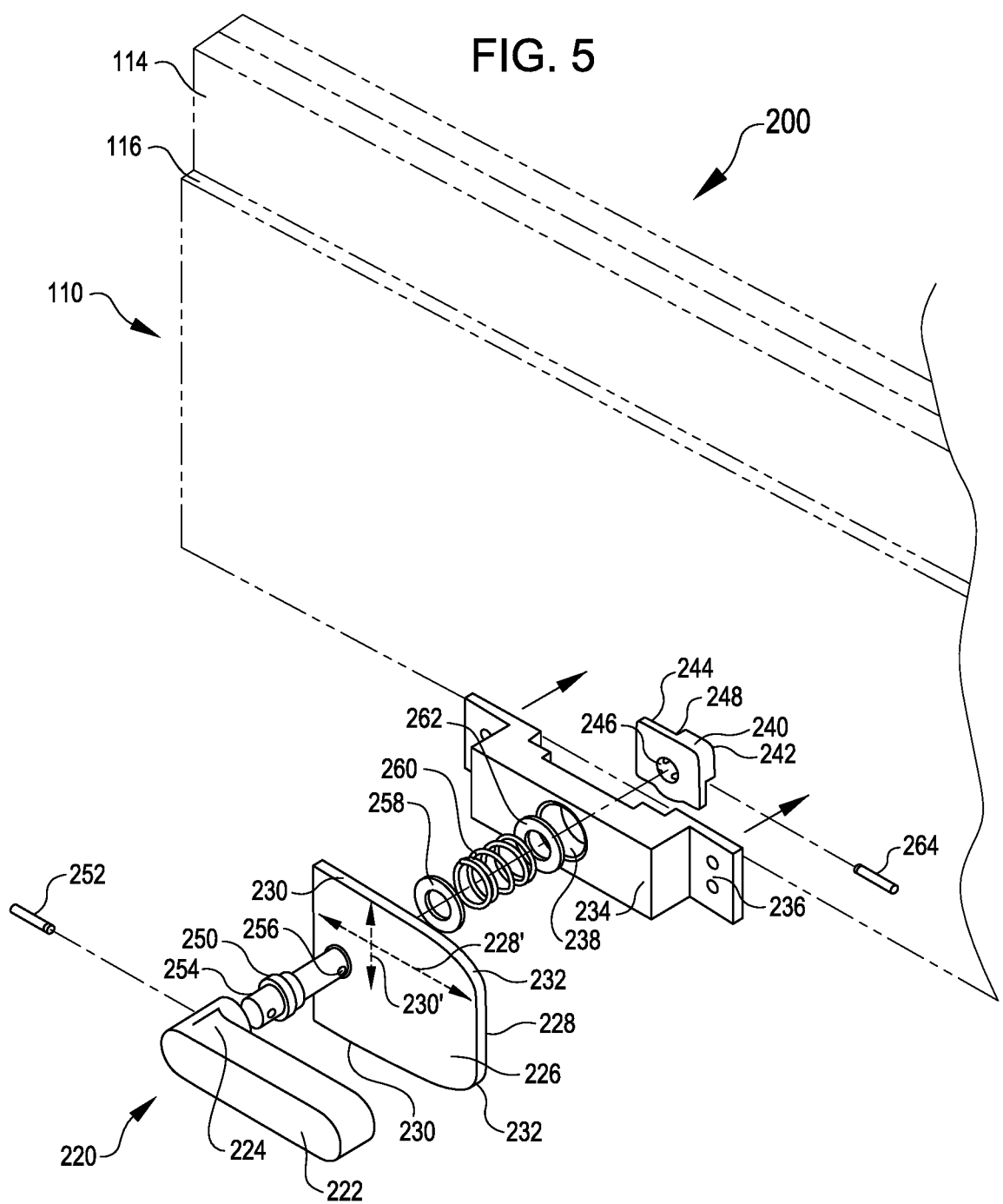
FIG. 5 is an exploded assembly view of a second latch mechanism for use with a passenger seat such as the passenger seat shown in FIG. 1.

In FIG. 5, a passenger article assembly 200 including a second example of a latch mechanism 220 is shown which can include a handle 222 and an eccentric member 226. The latch mechanism 220 can be operated in a manner similar to the operation of the latch mechanism 120 shown above in FIGS. 1-4. For example, the handle 222 and eccentric member 226 are fixed relative to one another and rotatable relative to the latch mechanism 220, such that the eccentric member 226 can be rotated by a user by rotating the handle 222. Unlike latch mechanism 120, the second exemplary latch mechanism 220 provides for added stability in its locked and unlocked configurations by, e.g., the interaction of a spindle 250 and a support block 240. The spindle 250 differs from the connector 154 in that the spindle 250 passes through the eccentric member 226 to interact with the support block 240.

The latch mechanism 220 includes the handle 222 and eccentric member 226 which are fixed relative to one another. In some cases, the handle 222 and eccentric member 226 may be connected together by way of spindle 250. The spindle 250 can pass through an axis 224 of the handle 222 and the eccentric member 226. The handle 222 may be connected with the spindle 250 by any suitable connector, such as a first pin 252 which may be inserted through the handle 222 and into a first receiving hole 254 in the spindle 250.

Like the eccentric member 132 discussed above in reference to FIGS. 1-4, the eccentric member 226 can have one or more minor surfaces 230 a short distance 230' from the spindle 250, and one or more major surfaces 228 spaced a longer distance 228' from the spindle, and one or more curved working surfaces 232 that connect the minor and major working surfaces. The latch mechanism 220 is shown in an unlocked configuration in FIG. 5, with a minor working surface 230 facing down and the major working surface 228 facing to one side. The latch mechanism 220 can be actuated by causing the eccentric member 226 to rotate, such that the major working surface 228 moves until it is facing down, and the minor working surface 230 moves until it is facing to one side.

The latch mechanism 220 can include various features for connecting the handle 222 and eccentric member 226 with a passenger article 110, in accordance with embodiments. For example, and as also shown in FIG. 5, the spindle 250 may be sized to extend through the eccentric member 226. The spindle 250 may further extend through a through-hole 238 in a mounting element 234 which is connectible with an article such as the passenger article 110. The mounting element 234 may be attachable via connecting features 236, which may include through-holes for bolts, screws, pins, or any other suitable connector for attaching the mounting element 234 with the passenger article 110.

A support block 240 may be positioned opposite the mounting element 234. The support block 240 may be inserted into, connected with, or partially formed of the mounting element 234 in various embodiments. The support block 240 can include a through-hole 246 for receiving the spindle 250, as well as one or more blocking regions 242 and non-blocking regions 244 which may be separated by grooves 248 therebetween. The blocking and non-blocking regions 242, 244 are arranged to interact with the spindle 150 by way of, e.g., a second pin 264. The second pin 264 may be inserted into a second through-hole 256 of the spindle 250, so that rotating the spindle (e.g. by way of the handle 222) causes the second pin 264 to rotate from being in contact with one of the blocking regions 240 across a non-blocking region 242 and into contact with a different one of the blocking regions 240. The second pin 264 can be caused to be biased against the support block 240 by mechanical force. For example, a spring 260 and washers 258, 262 may be used to impart mechanical force between the second pin 264 and the support block 240. However, it will be understood that any comparable means may be used to bias the support block 240 against the second pin 264. It will also be understood that any suitable positive feature may be substituted for the second pin 264. The operation of the support block 240 and second pin 264 will be discussed further with reference to FIGS. 8 and 9.

Figure 6:
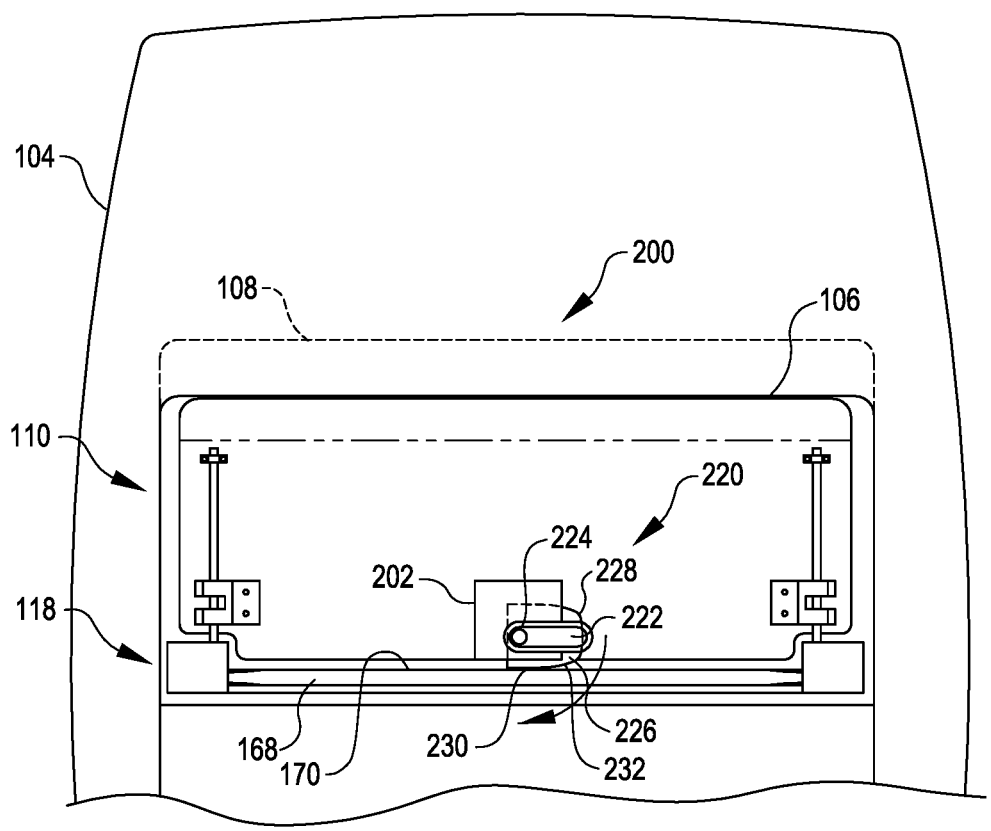
FIG. 6 is a front view of the latch mechanism of FIG. 5 assembled with the aft side of the passenger seat of FIG. 1 in an unlocked position.
Figure 7:
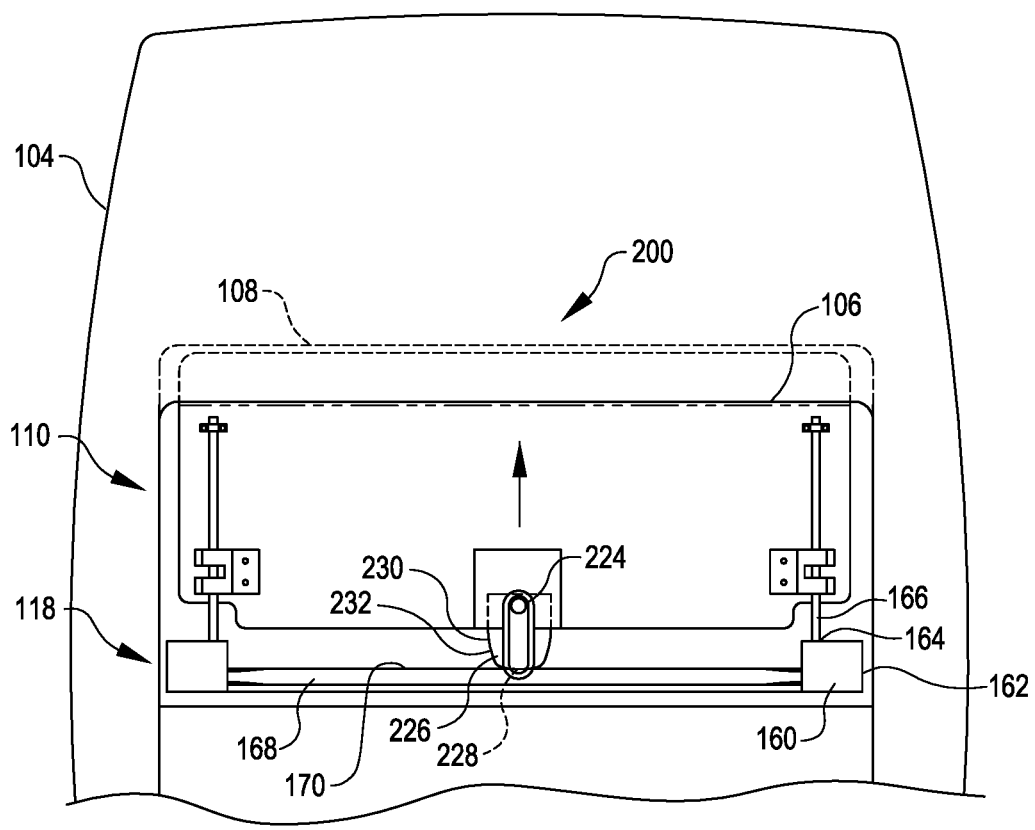
FIG. 7 is a front view of the latch mechanism of FIGS. 5 and 6 assembled with the aft side of the passenger seat of FIG. 1 in a locked position.

FIGS. 6 and 7 illustrate the passenger article assembly 200 in conjunction with a support assembly 118 and seat shroud 104 in both an unlocked configuration (FIG. 6) and a locked configuration (FIG. 7). For example, in FIG. 6, the passenger article assembly 200 is visible in a front view mounted adjacent to seat shroud 104. The seat shroud includes a receiving element such as a pocket 108 defined therein by a lip 106 that overhangs the pocket. In FIG. 6, the passenger article assembly 110 is shown upright, but not locked into the pocket 108; and in FIG. 7, the passenger article assembly is locked into the pocket.

In FIG. 6, the latch mechanism 220 is shown in the unlocked configuration. In the unlocked configuration, the eccentric member 226 is positioned with a minor working surface 230 positioned abutting the support surface 170 of the support assembly 118 and with the major working surface 228 facing to one side. The handle 222 is shown also positioned sideways; however it will be understood that the handle may have any arbitrary orientation with respect to the eccentric member 226 provided they are mechanically linked. In some embodiments, as shown, a cover 202 may be positioned between the handle 222 and eccentric member 226. As discussed above with reference to the latch mechanism 120 shown in FIGS. 1-4, the latch mechanism 220 may be actuated by rotating the handle 222 in order to rotate the eccentric member 226. As the eccentric member 226 rotates, one of the curved working surfaces 232 engages the support surface 170 of the support assembly 118. The curved working surface 232, as it engages the support surface 170, causes the latch mechanism 220 to move up and away from the support member 168 of the support assembly 118, and toward a locked configuration as shown in FIG. 7.

In FIG. 7, the latch mechanism 220 is shown in the locked configuration. In the locked configuration, the eccentric member 226 is positioned vertically, i.e. with the major working surface 228 abutting the support surface 170. The major working surface 228, being farther from the axis 224, causes the latch mechanism 220 to be supported farther from the support surface 170 in the locked configuration than it is in the unlocked configuration (see FIG. 6). Thus, the increased separation causes the latch mechanism 220 to press the passenger article assembly 200 upward, pushing the passenger article 110 up into the pocket 108 in the seat shroud 104 and behind the lip 106. The passenger article 110 may be slid upward along connecting features such as rods 166 connected with the support elements 160 of the support assembly 118. In various embodiments, the passenger article 110 may be connected with the support assembly 118 via any other suitable sliding connector such as a rail, slot, or groove; via a swiveling or rotating connector; or other comparable connector. The lip 106 prevents the passenger article 110 from falling outward toward a user when the passenger article assembly 200 is stowed and locked.

FIGS. 8 and 9 show rear views of the latch mechanism 220 of FIGS. 5-7, showing with particularity the interaction of a support block 240 with the second pin 262 of the latch mechanism in an unlocked position, in accordance with some embodiments. The unlocked configuration of the latch mechanism 220 in this example is similar to the configuration of the latch mechanism 220 as shown in FIG. 6.

The support block 240 is mounted to the mounting element 234 such that the support block 240 does not rotate relative to the mounting element. It will be understood that in alternative embodiments, the support block 240 may be integrated with, or formed of, the mounting element 234 without being a separate component. The support block 240 includes at least one blocking region 242 which is formed of a protruding section of the support block. The support block further includes at least one non-blocking region 244. Grooves 248 may be disposed at boundaries of each non-blocking region 244 adjacent to the blocking region(s). The grooves 248 are sized and positioned to interact with the spindle 250. For example, the grooves 248 can receive a second pin 264 that protrudes from the spindle 250, or may receive any other suitable element connected with or projecting from the spindle.

As shown in FIG. 8, the eccentric member 226 is arranged with the major working surface 228 facing to one side and a minor working surface 230 arranged abutting a support surface 170. The spindle 250 protrudes from the support block 240 at a center of the support block and between the blocking and non-blocking regions 242, 244. The spindle 250 can have a second pin 264 disposed therein, protruding from one or more sides of the spindle 250. In some cases, in lieu of the second pin 248, a spindle 250 may possess any suitable or comparable positive surface feature.

In operation, the eccentric member 226 is rotated relative to the mounting element 234, e.g. by a user rotating the handle 222, or by other suitable means. As the eccentric member 226 rotates, the spindle 250 also rotates. In some cases, the second pin 248 is at least partly embedded in one of the grooves 248, such that rotating the eccentric member 226 or handle 222 requires overcoming a resisting force caused by the second pin 248 interacting with the grooves 248. The second pin 248 will cross over one of the non-blocking regions 244 as the spindle 250 rotates and as the latch mechanism 220 is moved toward the locking configuration. Thus, the spindle can rotate through only a prescribed arc 266 due to the second pin 262 interacting with the blocking regions 242. In some embodiments, the prescribed arc 266 is about 90 degrees. However, various configurations of blocking regions and non-blocking regions 242, 244 are possible, which may define prescribed arcs 266 of any suitable range.

FIG. 9 shows a rear view of the latch mechanism 220 of FIGS. 5-8, showing with particularity the interaction of a support block 240 with the second pin 262 of the latch mechanism in a locked position. As the eccentric member 226 is rotated into the locked position (see also FIG. 7), the major working surface 228 of the eccentric member 226 is pressed into contact with the support surface 170. As the major working surface 228 is farther from the spindle 250 than the minor working surface 230, moving the eccentric member 226 into the locking position will cause the spindle, and concomitantly the mounting element 234 and any attached passenger article to be pressed upward away from the support surface 170.

In operation, the eccentric member 226 can be rotated by a user, e.g. by rotation of the connected handle 222, to alternatingly place the latch mechanism 220 into an unlocked or locked configuration. In some cases, operating the latch mechanism 220 may require that the second pin 264 be unseated from a groove 248, e.g. by pressing on the spindle 250 by way of pressing on the handle 222. In some other cases, e.g. if the grooves 248 are shallow compared to a diameter of the second pin 264, the grooves and second pin may interact to provide some resistance to rotation of the handle 222 without preventing the rotation.

Figure 10:
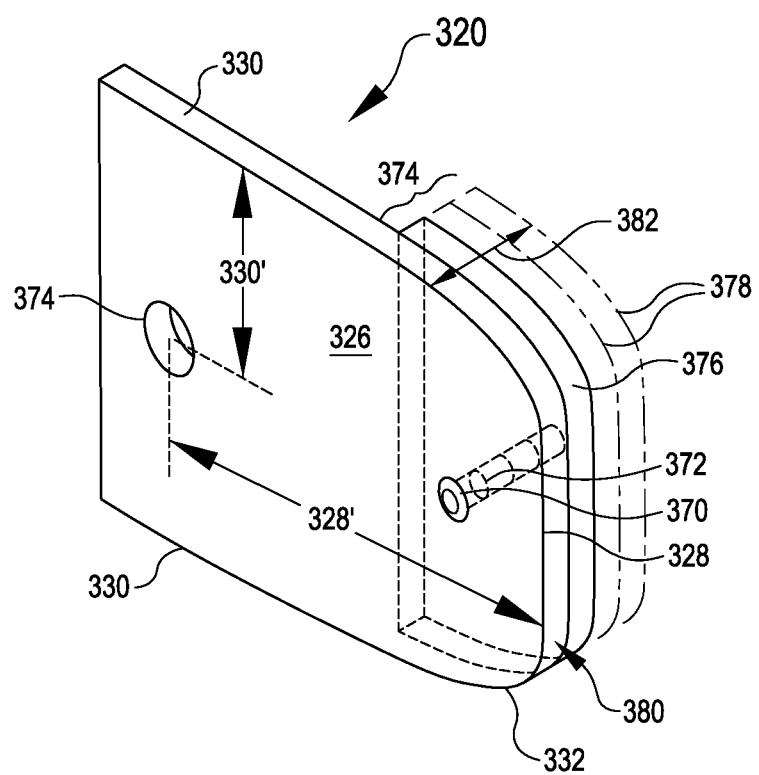
FIG. 10 is a perspective view of an alternative eccentric member for use with the latch mechanisms of FIG. 2 or FIG. 5.

FIG. 10 shows a perspective view of an alternative eccentric member 320 for use with a latch mechanism, such as the latch mechanisms 120 or 220 of FIG. 2 or FIG. 5. The eccentric member 320, similar to eccentric members 120 or 220 (FIG. 2 or 5) has an axis 340 that can rotatingly receive a connector such as a spindle, pin, bolt, or other suitable connector. The eccentric member 320 has a body 326 and a cam-like periphery 380 defining a major working surface 328 a long, first distance 328' from the axis 340; and a minor working surface 330 a shorter second distance 330' from the axis than the major working surface. One or more curved working surfaces 332 connect the major and minor working surfaces 328 and 330 around the periphery 380.

In some cases, the eccentric member 320 may be relatively thin, e.g. less than 0.25" thick, or less than 0.2", 0.15", 0.1", 0.05", or comparably thin, e.g. when the eccentric member is a stamped sheet metal part or comparable stamped part. Thus, a total thickness 382 of the eccentric member 320 may be enhanced by the addition of a stack 374 of spacers 376, 378. In some cases, a single spacer 376 may be assembled with the eccentric member 320, but in other cases, a plurality of additional spacers 378 may be further added to the eccentric member 320 to contribute to the total thickness 382. The spacer(s) 376, 378 are shaped to match at least a portion of the periphery 380 of the spacer 320 without interfering with the axis 340 or other components. The spacer(s) 376, 378 may be connected with the eccentric member body 326 by any suitable connecting method, such as welding, adhesive, bolts, screws, pins, rivets, or comparable methods. For example, as shown in FIG. 10, a rivet 370 has been inserted through a second through-hole 372 in the eccentric member 320 in order to align and connect the spacer(s) 376, 378.

In the following, further examples are described to facilitate the understanding of the disclosure:

Example 1: a latch component comprising a support assembly that supports a passenger article and allows the passenger article to move with respect to the support assembly; and an eccentric member having an axis and a periphery, the periphery comprising a major working surface and a minor working surface, the major working surface being farther from the axis than the minor working surface; wherein the eccentric member is configured to rotatingly connected with the passenger article and arranged to engage with the support assembly such that, when the eccentric member is rotated, the eccentric member causes the passenger article to displace relative to the support assembly.

Example 2: the component of any of the preceding or subsequent examples, wherein the passenger article comprises a tray table.

Example 3: the component of any of the preceding or subsequent examples, wherein the eccentric member is rotatingly connected with a bottom of the passenger article when the passenger article is in an upright position; the support assembly comprises a support surface facing the eccentric member; and the eccentric member is in contact with the support surface.

Example 4: the component of any of the preceding or subsequent examples, wherein the component has an unlocked configuration and a locked configuration, wherein in the unlocked configuration, the minor working surface of the eccentric member is in contact with the support assembly; and wherein in the locked configuration, the major working surface of the eccentric member is in contact with the support assembly.

Example 5: the component of any of the preceding or subsequent examples, further comprising a handle that is mechanically linked with the eccentric member such that, when the handle is rotated, the eccentric member is rotated with the handle.

Example 6: the component of any of the preceding or subsequent examples, further comprising a mounting element that receives the eccentric member, the eccentric member being rotatingly connected with the mounting element, and the mounting element being configured to connect with the passenger article.

Example 7: the component of any of the preceding or subsequent examples, wherein the major working surface is a first distance from the axis, and wherein the minor working surface is a second distance from the axis, the first distance being longer than the second distance.

Example 8: the component of any of the preceding or subsequent examples, wherein the first distance is at least 0.25 inches greater than the second distance.

Example 9: the component of any of the preceding or subsequent examples, wherein the eccentric member further comprises a curved working surface disposed at a periphery of the eccentric member between the major working surface and the minor working surface, the curved working surface being configured to cause the eccentric member to displace relative to the support assembly when the eccentric member is rotated.

Example 10: the component of any of the preceding or subsequent examples, further comprising a spindle, wherein the spindle is connected with the eccentric member configured to interact with one or more blocking regions and one or more non-blocking regions, such that the spindle can rotate through only a prescribed arc defined by the one or more blocking regions and one or more non-blocking regions.

Example 11: the component of any of the preceding or subsequent examples, wherein the spindle further comprises a pin extending laterally from the spindle, and wherein the pin is configured to interact with the one or more blocking regions and one or more non-blocking regions.

Example 12: the component of any of the preceding or subsequent examples, further comprising one or more grooves configured to interact with the pin, and wherein the latch mechanism further comprises a means for biasing the pin against the one or more grooves such that the grooves resist rotation of the spindle by way of the pin when the pin is in one of the one or more grooves.

Example 13: the component of any of the preceding examples, wherein the eccentric member comprises a primary eccentric part having a first thickness, and further comprising one or more spacing parts connected with the primary structural part, the one or more spacing parts each having a major working edge and a minor working edge, each major working edge configured to align with the major working surface of the periphery of the eccentric member, and each minor working edge configured to align with the minor working surface of the eccentric member, such that the combined primary structural part and one or more spacing parts has a combined thickness greater than the first thickness.

Example 14: A passenger seat assembly, comprising a passenger seat; a support assembly connected with the passenger seat at least partially below the seatback shroud a passenger article supported by the support assembly; and a latch mechanism arranged to interact with the passenger article and the support assembly, wherein the latch mechanism comprises an eccentric member connected to one of the support assembly and the passenger article, the eccentric member being rotatable and having at least one working surface in contact with one of the passenger article and the support assembly, such that the eccentric member causes the passenger article to displace relative to the support assembly when the eccentric member is rotated.

Example 15: the assembly of any of the preceding or subsequent examples, further comprising a seatback shroud connected with the passenger seat, where the seatback shroud comprises a pocket configured to at least partially receive the passenger article such that, when the passenger article is moved when the eccentric member is rotated, the passenger article is at least partially received by the pocket.

Example 16: the assembly of any of the preceding or subsequent examples, wherein the passenger article is rotatable relative to the support assembly when the passenger article is not received by the pocket, and wherein the passenger article is secured in an upright position when the passenger article is at least partially received by the pocket.

Example 17: the assembly of any of the preceding or subsequent examples, wherein the passenger article does not protrude into a head path of a passenger when the passenger article is at least partially received by the pocket.

Example 18: the assembly of any of the preceding or subsequent examples, wherein the latch mechanism is positioned below a head path of a passenger.

Example 19: the assembly of any of the preceding or subsequent examples, wherein the passenger article comprises a tray table.

Example 20: A method of stowing a passenger article of a passenger seat, the method comprising, with the passenger article aligned with a pocket of a seatback shroud of the passenger seat, rotating an eccentric member connected with the passenger article such that one or more working surfaces of the eccentric member contact a support surface adjacent with the eccentric member; and displacing the passenger article relative to the support surface by the eccentric member, such that the passenger article is received in the pocket.

Example 21: the method of the preceding example, wherein rotating the eccentric member further comprises, with a minor working surface of the one or more working surfaces of the eccentric member in contact with the support surface, rotating the eccentric member from an unlocked position to a locked position, such that when the eccentric member is rotated, a curved working surface of the periphery of the eccentric member presses against the support surface causing an axis of the eccentric member to displace away from the support surface, and such that the eccentric member comes to rest in the locked position with a major working surface of the eccentric member in contact with the support surface, the major working surface being a greater distance from the axis than the minor working surface.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A latch mechanism, comprising:
a support assembly that supports a passenger article and allows the passenger article to move with respect to the support assembly; and
an eccentric member having an axis and a periphery, the periphery comprising a major working surface and a minor working surface connected by a continuous convex working surface of the periphery, the major working surface being farther from the axis than the minor working surface; wherein the eccentric member is configured to be rotatingly connected with the passenger article and arranged to engage with a rigid support surface of the support assembly such that, when the eccentric member is rotated, the eccentric member causes the passenger article to displace relative to the support assembly.

2. The latch mechanism of claim 1, wherein the passenger article comprises a tray table.

3. The latch mechanism of claim 1, wherein:
the eccentric member is rotatingly connected with a bottom of the passenger article when the passenger article is in an upright position;
the support surface is oriented facing the eccentric member; and
the eccentric member is in contact with the support surface.

4. The latch mechanism of claim 1, comprising an unlocked configuration and a locked configuration, wherein:
in the unlocked configuration, the minor working surface of the eccentric member is in contact with the support assembly; and
in the locked configuration, the major working surface of the eccentric member is in contact with the support assembly.

5. The latch mechanism of claim 1, further comprising a handle that is mechanically linked with the eccentric member such that, when the handle is rotated, the eccentric member is rotated with the handle.

6. The latch mechanism of claim 1, further comprising a mounting element that receives the eccentric member, the eccentric member being rotatingly connected with the mounting element, and the mounting element being configured to connect with the passenger article.

7. The latch mechanism of claim 1, wherein the major working surface is a first distance from the axis, and wherein the minor working surface is a second distance from the axis, the first distance being longer than the second distance.

8. The latch mechanism of claim 7, wherein the first distance is at least 0.25 inches greater than the second distance.

9. The latch mechanism of claim 1, wherein the continuous convex working surface that connects the major working surface and minor working surface is configured to cause the eccentric member to displace relative to the support assembly when the eccentric member is rotated.

10. The latch mechanism of claim 1, further comprising a spindle, wherein the spindle is connected with the eccentric member configured to interact with one or more blocking regions and one or more non-blocking regions, such that the spindle can rotate through only a prescribed arc defined by the one or more blocking regions and one or more non-blocking regions.

11. The latch mechanism of claim 10, wherein the spindle further comprises a pin extending laterally from the spindle, and wherein the pin is configured to interact with the one or more blocking regions and one or more non-blocking regions.

12. The latch mechanism of claim 11, further comprising one or more grooves configured to interact with the pin, and wherein the latch mechanism further comprises a means for biasing the pin against the one or more grooves such that the grooves resist rotation of the spindle by way of the pin when the pin is in one of the one or more grooves.

13. The latch mechanism of claim 1, wherein the eccentric member comprises a primary structural eccentric part having a first thickness, and further comprising:
one or more spacing parts connected with the primary structural eccentric part, the one or more spacing parts each having a major working edge and a minor working edge, each major working edge configured to align with the major working surface of the eccentric member, and each minor working edge configured to align with the minor working surface of the eccentric member, such that the combined primary structural eccentric part and one or more spacing parts has a combined thickness greater than the first thickness.

14. A passenger seat assembly, comprising:
a passenger seat;
a support assembly connected with the passenger seat;
a passenger article supported by the support assembly; and
a latch mechanism configured to displace the passenger article with respect to the support assembly, wherein:
the latch mechanism comprises an eccentric member connected to one of the support assembly and the passenger article, the eccentric member being rotatable and having an axis and a periphery, the periphery comprising a major working surface and a minor working surface connected by a continuous convex working surface of the periphery, the major working surface being farther from the axis than the minor working surface; wherein the eccentric member is configured to be rotatingly connected with the passenger article or with the support assembly and arranged to engage with a rigid surface of the other one of the passenger article and the support assembly, such that the eccentric member causes the passenger article to displace relative to the support assembly when the eccentric member is rotated.

15. The passenger seat assembly of claim 14, further comprising a seatback shroud connected with the passenger seat, where the seatback shroud comprises a pocket configured to at least partially receive the passenger article such that, when the passenger article is moved when the eccentric member is rotated, the passenger article is at least partially received by the pocket.

16. The passenger seat assembly of claim 15, wherein the passenger article is rotatable relative to the support assembly when the passenger article is not received by the pocket, and wherein the passenger article is secured in an upright position when the passenger article is at least partially received by the pocket.

17. The passenger seat assembly of claim 15, wherein the passenger article is retained parallel to the passenger seat back when the passenger article is at least partially received by the pocket.

18. The passenger seat assembly of claim 14, wherein the latch mechanism is positioned below the passenger article.

19. The passenger seat assembly of claim 14, wherein the passenger article comprises a tray table.

20. A method of stowing a passenger article of a passenger seat, the method comprising:
with the passenger article aligned with a pocket of a seatback shroud of the passenger seat,
rotating an eccentric member that is rotatingly connected with one of the passenger article or with a support assembly that supports the passenger article, the eccentric member being rotatable and having an axis and periphery, the periphery comprising a major working surface and a minor working surface connected by a continuous convex working surface of the periphery, the major working surface being farther from an axis of the eccentric member than the minor working surface, such that the minor working surface of the eccentric member contacts a rigid support surface of one of the support assembly or the passenger article adjacent to the eccentric member; and
displacing the passenger article relative to the support surface by the rotating, such that the major working surface bears against the support surface causing the passenger article to be received in the pocket.

21. The method of claim 20, wherein rotating the eccentric member further comprises: rotating the eccentric member from an unlocked position to a locked position, such that when the eccentric member is rotated, the continuous convex working surface of the eccentric member presses against the rigid support surface causing the eccentric member to displace away from the support surface, such that the eccentric member comes to rest in the locked position with the major working surface of the eccentric member in contact with the support surface.

* * * * *